(12) United States Patent
Kanno

(10) Patent No.: US 11,044,374 B2
(45) Date of Patent: *Jun. 22, 2021

(54) IMAGE READING APPARATUS

(71) Applicant: CANON KABUSHIKI KAISHA, Tokyo (JP)

(72) Inventor: Akiko Kanno, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,763

(22) Filed: Jun. 19, 2020

(65) Prior Publication Data

US 2020/0322497 A1 Oct. 8, 2020

Related U.S. Application Data

(63) Continuation of application No. 16/582,523, filed on Sep. 25, 2019, now Pat. No. 10,750,041.

(30) Foreign Application Priority Data

Oct. 5, 2018 (JP) .............................. JP2018-190313

(51) Int. Cl.
*H04N 1/00* (2006.01)
*H04N 1/028* (2006.01)
*H04N 1/10* (2006.01)

(52) U.S. Cl.
CPC ..... *H04N 1/00713* (2013.01); *H04N 1/00631* (2013.01); *H04N 1/00737* (2013.01);
(Continued)

(58) Field of Classification Search
CPC .. H04N 2201/0081; H04N 1/193; H04N 1/12; H04N 1/1061; H04N 1/1017; H04N 2201/044; H04N 1/00615; H04N 1/00997; H04N 1/0313; H04N 1/0464; H04N 1/123; H04N 1/4076; H04N 2201/0094; H04N 2201/0422; H04N 1/00588;
(Continued)

(56) References Cited

U.S. PATENT DOCUMENTS 6,779,873 B2    8/2004 Maeda et al. .................. 347/43
7,558,524 B2    7/2009 Ooshima et al. ............. 399/370
(Continued)

FOREIGN PATENT DOCUMENTS

JP    2006-041579    2/2006
JP    2017-059879    3/2017

*Primary Examiner* — Negussie Worku
(74) *Attorney, Agent, or Firm* — Venable LLP

(57) ABSTRACT

An image reading apparatus includes a detection unit provided at a position separated from a positioning portion by a predetermined distance in a first direction, a discriminator configured to determine a length, in the first direction, of a document, and a setting unit that sets a start position to a first position if a detection position at which the detection unit detects the document is not included in a range, in a second direction, of the transparent member that is covered by the document, and sets the start position to a second position if the detection position is included in the range and the detection unit does not detect the document, wherein, in the first direction, the distance between the first position and the positioning portion is larger than the distance between the second position and the positioning portion.

9 Claims, 13 Drawing Sheets

(52) U.S. Cl.
CPC ..... *H04N 1/00748* (2013.01); *H04N 1/02815* (2013.01); *H04N 1/1061* (2013.01)

(58) Field of Classification Search
CPC ........... H04N 1/00745; H04N 1/00572; H04N 1/00578; H04N 1/00602; H04N 1/00718; H04N 1/00737; H04N 1/00278; H04N 1/00649; H04N 1/00785; H04N 1/3878; H04N 1/409; H04N 2201/0091; H04N 2201/0098; H04N 1/0058; H04N 1/00631; H04N 1/00713; H04N 1/00734; H04N 1/00748; H04N 1/00755; H04N 1/02815; H04N 1/00591; H04N 1/00612; H04N 1/00663; H04N 1/00687; H04N 1/00689; H04N 1/00758; H04N 1/00771; H04N 1/00803; H04N 1/00816; H04N 1/00824; H04N 1/00525; H04N 1/00777; H04N 1/02835; H04N 2201/02456; H04N 2201/02462; H04N 2201/0436; G03G 15/607; G03G 15/23; G03G 15/60; G03G 15/602; G03G 2215/00316; G03G 2215/0035; B65H 2220/01; B65H 2511/13; B65H 2511/152; B65H 2511/17; B65H 2513/512; B65H 3/06; B65H 5/062; B65H 7/02; B65H 2220/02; B65H 2220/03; B65H 2553/612; B65H 5/06; B65H 5/24; B65H 5/34; B65H 5/36; B65H 7/04; B65H 7/06; B65H 7/18; B65H 1/04; B65H 2301/44324; B65H 2405/1136; B65H 2553/41; B65H 2553/414; B65H 2553/822; B65H 2801/03; B65H 2801/06; B65H 2801/39; B65H 3/0684; B65H 5/068; B65H 7/08; B65H 7/14

USPC ......................................... 358/474, 475, 509
See application file for complete search history.

(56) References Cited

U.S. PATENT DOCUMENTS

| | | | |
|---|---|---|---|
| 7,715,067 B2* | 5/2010 | Tsai ..................... | H04N 1/1017 358/497 |
| 8,310,733 B2 | 11/2012 | Sekiguchi et al. ............ | 358/474 |
| 8,432,586 B2 | 4/2013 | Hamano et al. ............... | 358/505 |
| 8,583,004 B2 | 11/2013 | Kamimura .................... | 399/110 |
| 9,069,326 B2 | 6/2015 | Onishi et al. ...... | G03G 21/1633 |
| 9,221,636 B2 | 12/2015 | Ota et al. ................. | B65H 7/14 |
| 9,363,396 B2 | 6/2016 | Sakakibara et al. ......................... | H04N 1/00559 |
| 10,542,166 B2 | 1/2020 | Seki et al. ......... | H04N 1/00745 |
| 10,750,041 B2* | 8/2020 | Kanno ............... | H04N 1/00748 |
| 2005/0191100 A1 | 9/2005 | Ooshima et al. ............. | 399/370 |
| 2010/0085611 A1* | 4/2010 | Quan ................. | H04N 1/00681 358/474 |
| 2010/0165424 A1* | 7/2010 | Maeda ................. | H04N 1/1017 358/498 |
| 2013/0182296 A1* | 7/2013 | Masaki ............. | H04N 1/00785 358/488 |
| 2014/0168731 A1* | 6/2014 | Nakayoshi ......... | H04N 1/00588 358/498 |
| 2015/0062662 A1* | 3/2015 | Ito ...................... | H04N 1/00689 358/441 |
| 2017/0034386 A1* | 2/2017 | Kusuhata ........... | H04N 1/00684 |
| 2017/0060493 A1* | 3/2017 | Furukawa ............ | H04N 1/2323 |
| 2017/0070619 A1* | 3/2017 | Hamada ............. | H04N 1/00013 |
| 2018/0332183 A1* | 11/2018 | Seki ..................... | H04N 1/00835 |
| 2019/0199874 A1 | 6/2019 | Oka et al. .......... | H04N 1/00708 |
| 2020/0177761 A1* | 6/2020 | Mizuno .............. | H04N 1/00822 |

\* cited by examiner

SUB SCANNING DIRECTION

MAIN SCANNING DIRECTION

FIG. 6

| LENGTH IN MAIN SCANNING DIRECTION (mm) | DETECTION RESULTS OF DOCUMENT DETECTION SENSOR | |
|---|---|---|
| | S0≠S1 | S0=S1 |
| 30~50 | SMALLEST | — |
| 50~126.7 | SMALL | — |
| 126.7~146 | STMTR | — |
| 146~169 | A5R | — |
| 169~197 | B6 | B5R |
| 197~214.5 | A5 | A4R |
| 214.5~244 | STMT | LTRR |
| 244~266.4 | B5 | B4R |
| 266.4~284 | LTR | LDRR |
| 284~302 | A4 | A3R |

| DETECTION RANGE IN MAIN SCANNING DIRECTION | DETECTION RESULTS OF DOCUMENT DETECTION SENSOR | |
|---|---|---|
| | DOCUMENT IS NOT PRESENT | DOCUMENT IS PRESENT |
| UNTIL POSITION 1001 | — | — |
| UNTIL POSITION 1002 | SMALLEST | — |
| UNTIL POSITION 1003 | A6 | — |
| UNTIL POSITION 1004 | B6 | B5R |
| UNTIL POSITION 1005 | A5 | A4R |
| UNTIL POSITION 1006 | B5 | B4 |
| UNTIL POSITION 1007 | A4 | A3 |

| M0[1] | M0[2] | M0[3] | M0[4] | M0[5] | M0[6] | M0[7] |
|-------|-------|-------|-------|-------|-------|-------|
| BLACK | BLACK | BLACK | BLACK | BLACK | WHITE | WHITE |

| M1[1] | M1[2] | M1[3] | M1[4] | M1[5] | M1[6] | M1[7] |
|-------|-------|-------|-------|-------|-------|-------|
| WHITE | GRAY  | WHITE | WHITE | BLACK | —     | —     |

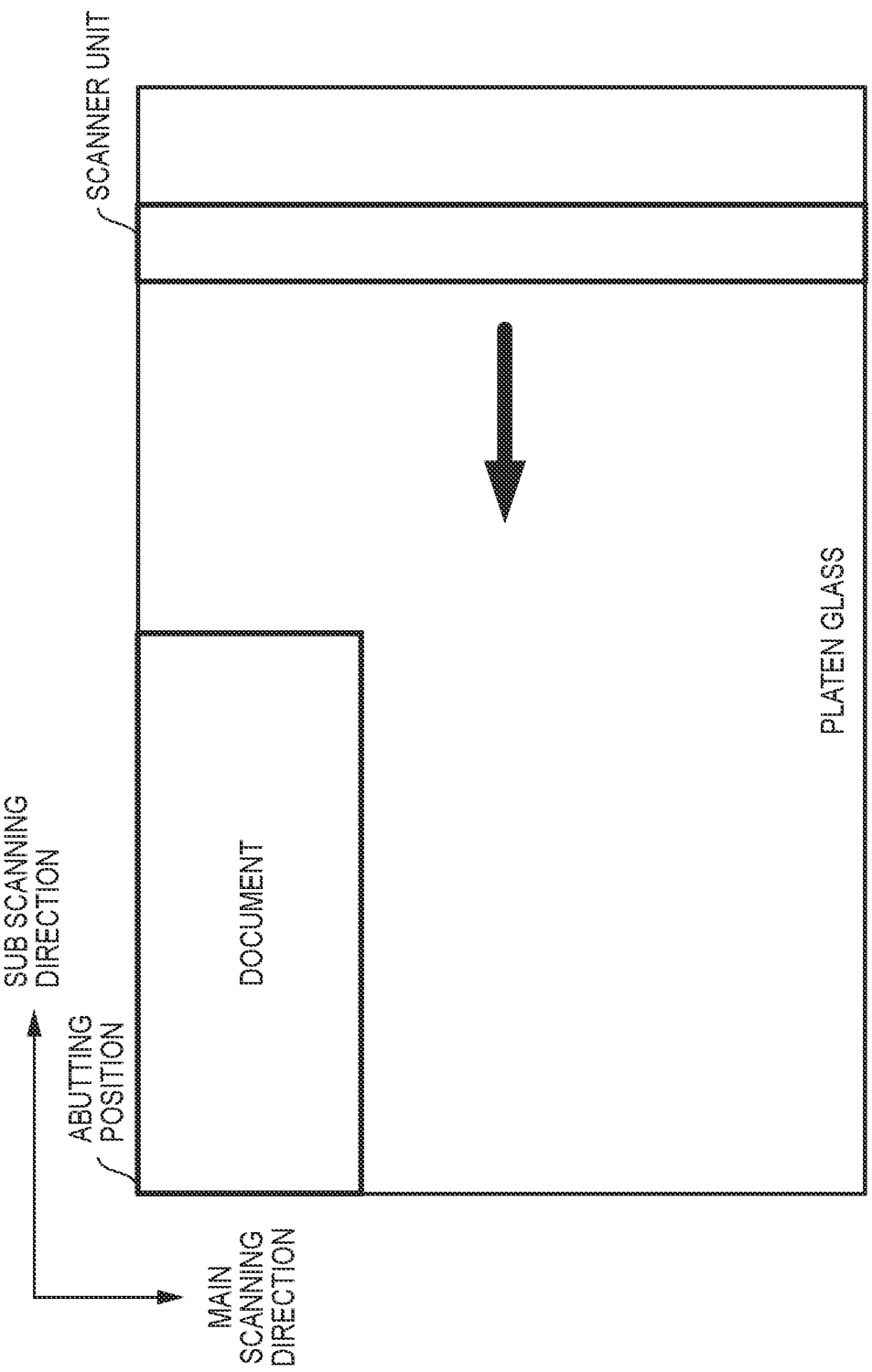

IMAGE READING APPARATUS

This application is a continuation of application Ser. No. 16/582,523 filed Sep. 25, 2019, currently pending; and claims priority under 35 U.S.C. § 119 to Japan Application No. 2018-190313 filed on Oct. 5, 2018; and the contents of all of which are incorporated herein by reference as if set forth in full.

BACKGROUND OF THE INVENTION

Field of the Invention

The present invention relates to a technique for determining the size of a sheet in an image reading apparatus.

Description of the Related Art

An image reading apparatus includes a scanner unit that includes a light source that emits light onto a document on a platen glass, and a line sensor that receives light reflected from the document to which the light source has emitted light. The line sensor includes a plurality of pixels that are arranged in a main scanning direction, and reads an image of one line in a main scanning direction at the same time. The scanner unit is moved along a sub scanning direction that is orthogonal to the main scanning direction, and an image, of the document, of one line is read at each of a plurality of positions in the sub scanning direction, and as a result, an image of the entire document can be read.

Japanese Patent Laid-Open No. 2017-59879 discloses a configuration in which the size of a document on a platen glass is automatically detected. Specifically, with respect to the sub scanning direction, whether or not the document is larger than a predetermined size is detected using a sensor arranged at a predetermined position, and with respect to the main scanning direction, the document size is detected using a reading result of the scanner unit. Also, a method of determining which of the regular sizes the document size is, based on the detection results in the main scanning direction and the sub scanning direction, is disclosed in Japanese Patent Laid-Open No. 2017-59879. For example, when the length in the main scanning direction is 297 mm, and if the size in the sub scanning direction is large, the document size can be determined to be A3 size, and if the size in the sub scanning direction is small, the document size can be determined to be A4 size. Also, Japanese Patent Laid-Open No. 2006-41579 discloses a configuration in which a document is read in a state in which a platen cover on a platen glass is open, in order to determine the document size other than the regular sizes (hereinafter, referred to as "irregular size"). Because the image of a document is read in a state in which the platen cover is open, the line sensor receives light reflected by the document with respect to positions at which the document is present, and does not receive reflected light with respect to positions at which the document is not present. Therefore, the image reading apparatus can determine the document size by detecting an edge of the document based on whether or not reflected light has been received.

As shown in FIG. 13, a document is placed on the platen glass such that one corner of the document abuts against an abutting position (corner portion configured by one side, of a support member that supports the platen glass, in parallel with the sub scanning direction, and a one side thereof in parallel with the main scanning direction). The configuration disclosed in Japanese Patent Laid-Open No. 2006-41579 is for determining the document size, which is an irregular size, by detecting edges of a document having an irregular size based on whether or not reflected light has been received. Here, in order to detect the document edge, reading by the scanner unit needs to be started at a position, in the sub scanning direction, at which the document is not present. Therefore, in order to determine the irregular size whose length in the sub scanning direction is unknown, whether or not reflected light has been received needs to be determined while the scanner unit is moved from an end portion, in the sub scanning direction, opposite to the abutting position, that is, a right end position in FIG. 13, toward the abutting position. However, light emitted from the scanner unit, at a position at which a document is not present, enters eyes of a user, and the user feels uncomfortable.

SUMMARY OF THE INVENTION

According to an aspect of the present invention, an image reading apparatus includes: a reading unit that includes: a transparent member on which a document is to be placed; a first positioning portion for positioning the document in a first direction by coming into contact with the document that has been placed on the transparent member; a second positioning portion for positioning the document in a second direction that intersects the first direction by coming into contact with the document that has been placed on the transparent member; a carriage including a light source that emits light and a reading element for receiving light reflected from the document that has been placed on the transparent member, the reading unit being configured to read an image of the document that has been placed on the transparent member while moving the carriage in the first direction, a cover member that pivots relative to the reading unit; a first detection unit that detects whether or not the cover member has pivoted by a predetermined angle or more relative to the reading unit; a second detection unit that is provided at a position separated from the first positioning portion by a first predetermined distance in the first direction, and provided at a position separated from the second positioning portion by a second predetermined distance in the second direction, and is configured to detect whether or not the document is present on the transparent member; a discriminator configured to determine a length, in the first direction, of the document placed on the transparent member based on an image obtained by the reading unit in a period in which the carriage moves from a measurement start position on a downstream side of the first positioning portion in the first direction toward the first positioning portion in a state in which the first detection unit has detected that the cover member has pivoted by the predetermined angle or more relative to the reading unit, and the light source emits the light; and a setting unit that sets the measurement start position to a first position in a case where a detection position at which the second detection unit detects the document is not included in a range, in the second direction, of the transparent member that is covered by the document, and sets the measurement start position to a second position in a case where the detection position is included in the range in the second direction and the second detection unit does not detect the document, wherein, in the first direction, the distance between the first position and the first positioning portion is larger than the distance between the second position and the first positioning portion.

Further features of the present invention will become apparent from the following description of exemplary embodiments with reference to the attached drawings.

BRIEF DESCRIPTION OF THE DRAWINGS

FIG. 6 is a diagram illustrating the first detection processing.

FIG. 13 is a diagram illustrating a document placed on a platen glass.

DESCRIPTION OF THE EMBODIMENTS

Hereinafter, illustrative embodiments of the present invention will be described with reference to the drawings. Note that the following embodiments are illustrative and do not limit the present invention to the contents of the embodiments. Also, in the following diagrams, constituent elements that are not required for describing the embodiments are omitted.

Figure 1A:
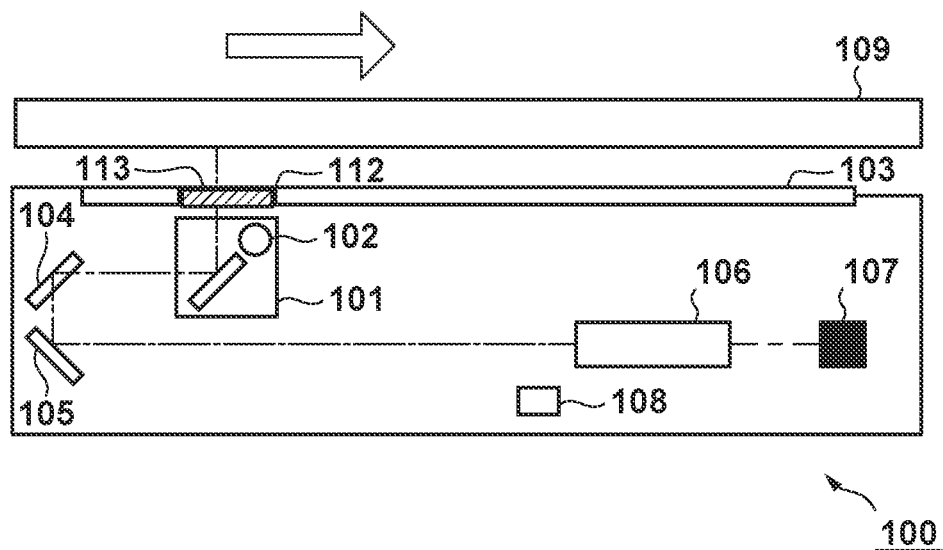
FIGS. 1A and 1B are diagrams illustrating a configuration of an image reading apparatus.
Figure 1B:
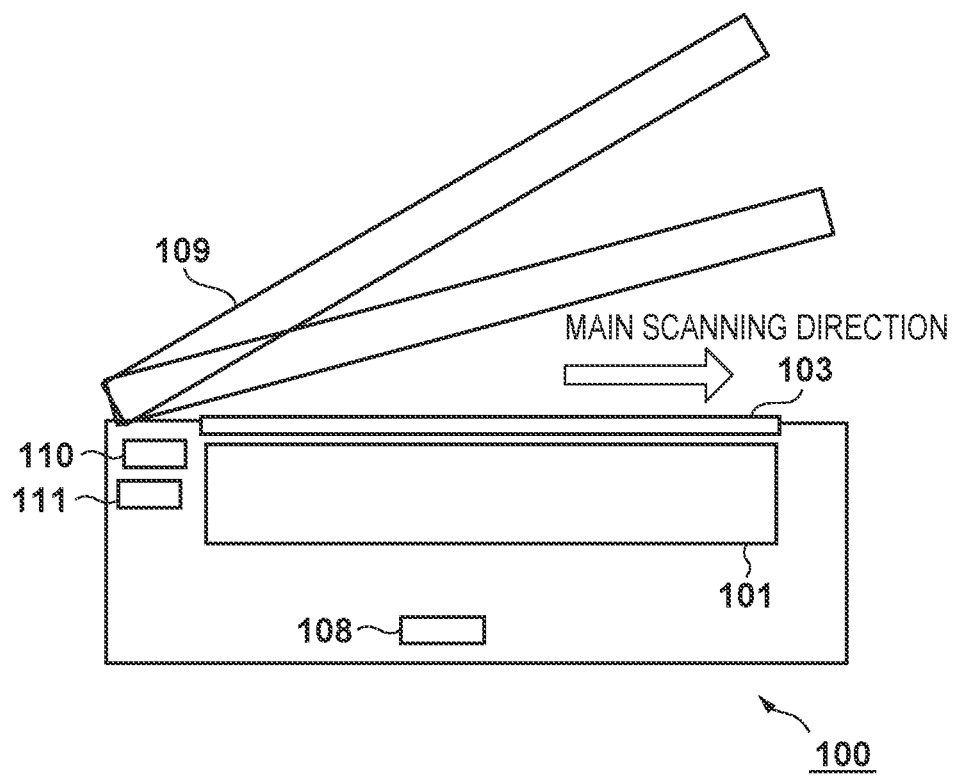

FIGS. 1A and 1B are diagrams illustrating a configuration of an image reading apparatus of the present embodiment. Note that FIG. 1A is a diagram in which a sub scanning direction extends in a left and right direction, and FIG. 1B is a diagram in which a main scanning direction extends in the left and right direction. A scanner unit 101 including a light source 102 is configured to be movable in the sub scanning direction. A document is placed on a platen glass (platen) 103, and the document is pressed toward the platen glass 103 by a pressing plate (platen cover) 109. Light is emitted from the light source 102 to the document via the platen glass 103, and light reflected by the document is incident on a line sensor 107 via mirrors 104 and 105 and a lens 106. With this, an image of one line of the document in the main scanning direction can be read. Also, as a result of the line sensor 107 repeating reading of an image of one line at a plurality of positions in the sub scanning direction while the scanner unit 101 is moved in the sub scanning direction, the image reading apparatus reads an image of the entire document.

Also, the image reading apparatus includes a reflection-type document detection sensor 108 for detecting a document placed on the platen glass 103. Moreover, the image reading apparatus includes a white reference plate 113 that abuts against one of two end portions, of the platen glass 103, in parallel with the main scanning direction. A white face of the white reference plate 113 on the scanner unit 101 side is used as a white reference when a document is read by the scanner unit 101. The face of the white reference plate 113 on a side opposite to the scanner unit 101 is used as a size indicator plate for indicating the document size. A corner portion at which a first end portion of a support member that supports the platen glass 103 and is in parallel with the sub scanning direction is in contact with a second end portion of the white reference plate 113 (size indicator plate) that abuts against the platen glass 103 and is in parallel with the main scanning direction constitutes an abutting position 112 of a document. For example, a user is guided to place a document on the platen glass 103 such that one corner of a document is abutted against the abutting position 112, and two sides of the document that are orthogonal to each other are brought into contact with the first end portion and the second end portion, respectively.

Also, as shown in FIG. 1B, a pressing plate 109 is configured to be pivotable with the pivoting shaft being a shaft in parallel with the sub scanning direction. In the present embodiment, an opening/closing detection sensor 110 detects whether the angle of the pressing plate 109 relative to the platen glass 103 is five degrees or more. Also, an opening/closing detection sensor 111 detects whether the angle of the pressing plate 109 relative to the platen glass 103 is 25 degrees or more. Therefore, a state in which the angle of the pressing plate 109 relative to the platen glass 103 is less than five degrees, a state in which the angle is five degrees or more and less than 25 degrees, and a state in which the angle is 25 degrees or more can be detected based on detection results of the opening/closing detection sensors 110 and 111. In the present embodiment, a state in which the angle of the pressing plate 109 relative to the platen glass 103 is less than five degrees is a closed state, and a state in which the pressing plate 109 relative to the platen glass 103 is 25 degrees or more is an open state. In the closed state, the entirety of the platen glass 103 is covered by the pressing plate 109. On the other hand, in the open state, at least a portion of the platen glass 103 is not covered by the pressing plate 109.

Figure 2:
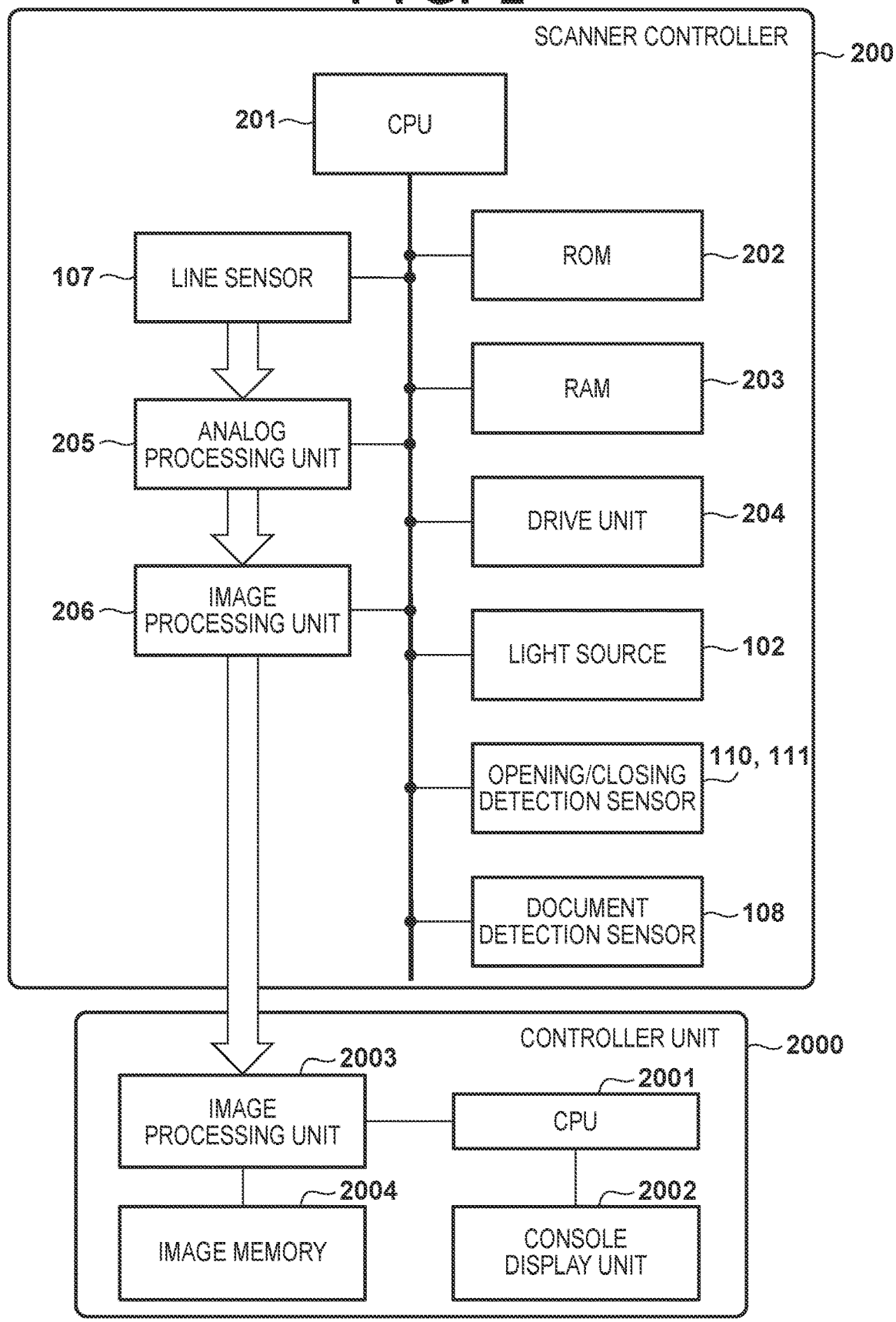
FIG. 2 is a diagram illustrating a control configuration of the image reading apparatus.

FIG. 2 illustrates a control configuration of the image reading apparatus 100. A CPU 201 of a scanner controller 200 executes a program stored in a ROM 203. A RAM 203 is used as a work area of the CPU 201. A drive unit 204 moves a scanner unit 101 in the sub scanning direction under the control of the CPU 201. When a document is to be read, first, the CPU 201 causes the scanner unit 101 to move to a position (hereinafter, shading position) under the white reference plate 113, as shown in FIG. 1A, by controlling the drive unit 204. Also, the CPU 201 causes the light source 102 to emit light, reads the white reference plate 113, and executes known shading correction processing. After executing shading correction processing, the CPU 201 causes the scanner unit 101 to move in the sub scanning direction in a state in which the light source 102 is emitting light. Then, the CPU 201 reads an image of the document using the line sensor 107, in which an end portion of the document in contact with the abutting position 112 is treated as a leading end thereof in the sub scanning direction. An analog image signal output from the line sensor 107 is converted to a digital image signal by an analog processing unit 205, and the digital image signal is output to a controller unit 2000 via an image processing unit 206. The digital image signal input to the controller unit 2000 is further subjected to image processing in an image processing unit 2003 in the controller unit 2000, and as a result, read image data is obtained. Note that the controller unit 2000 includes an image memory 2004 for storing image data in image processing, a console display unit 2002 for a user to operate the image reading apparatus, and a CPU 2001 that performs overall control on the image reading apparatus.

Size Detection Operation

Figure 3:
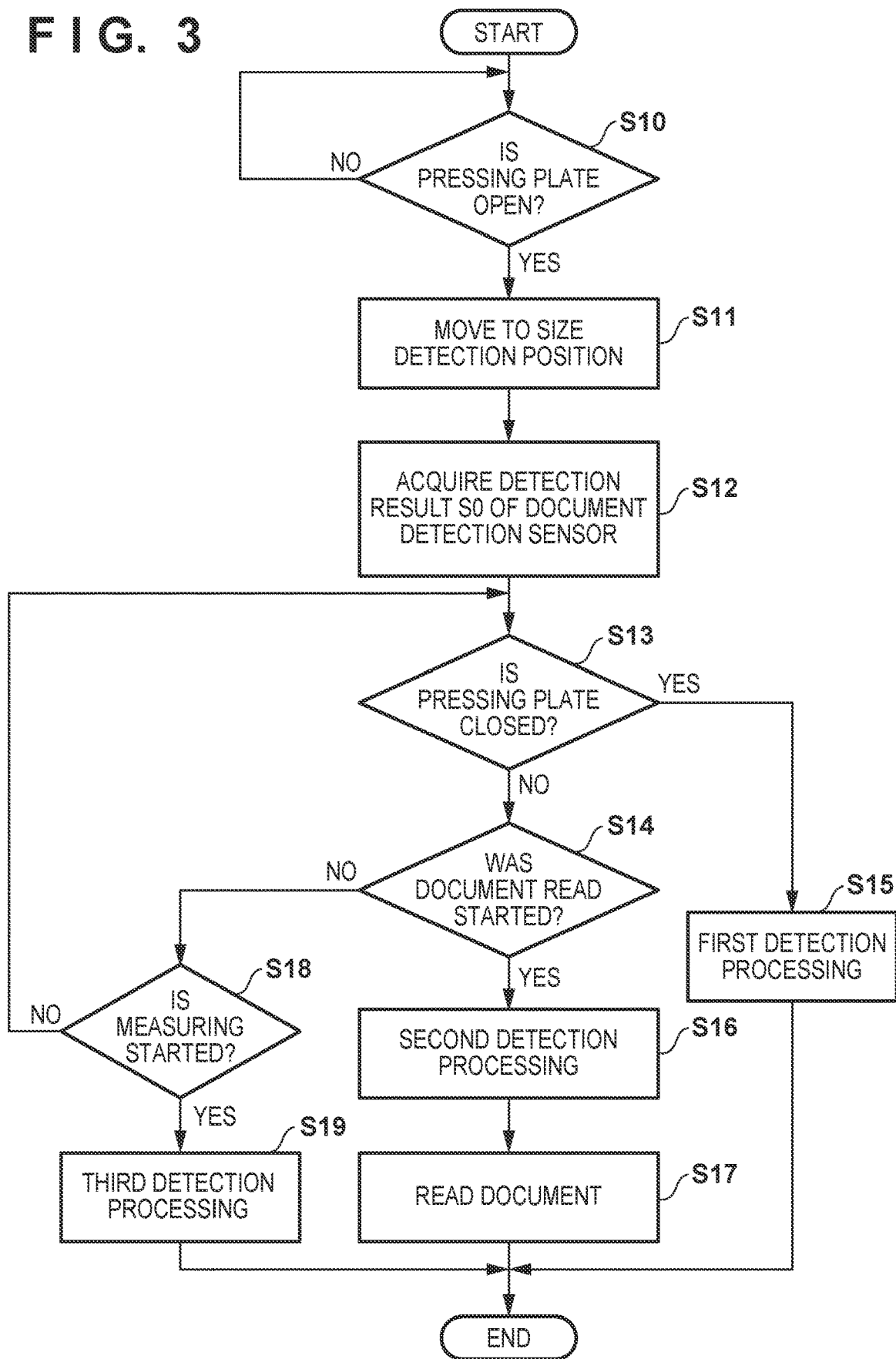
FIG. 3 is a flowchart of processing for detecting a document size.
Figure 4:
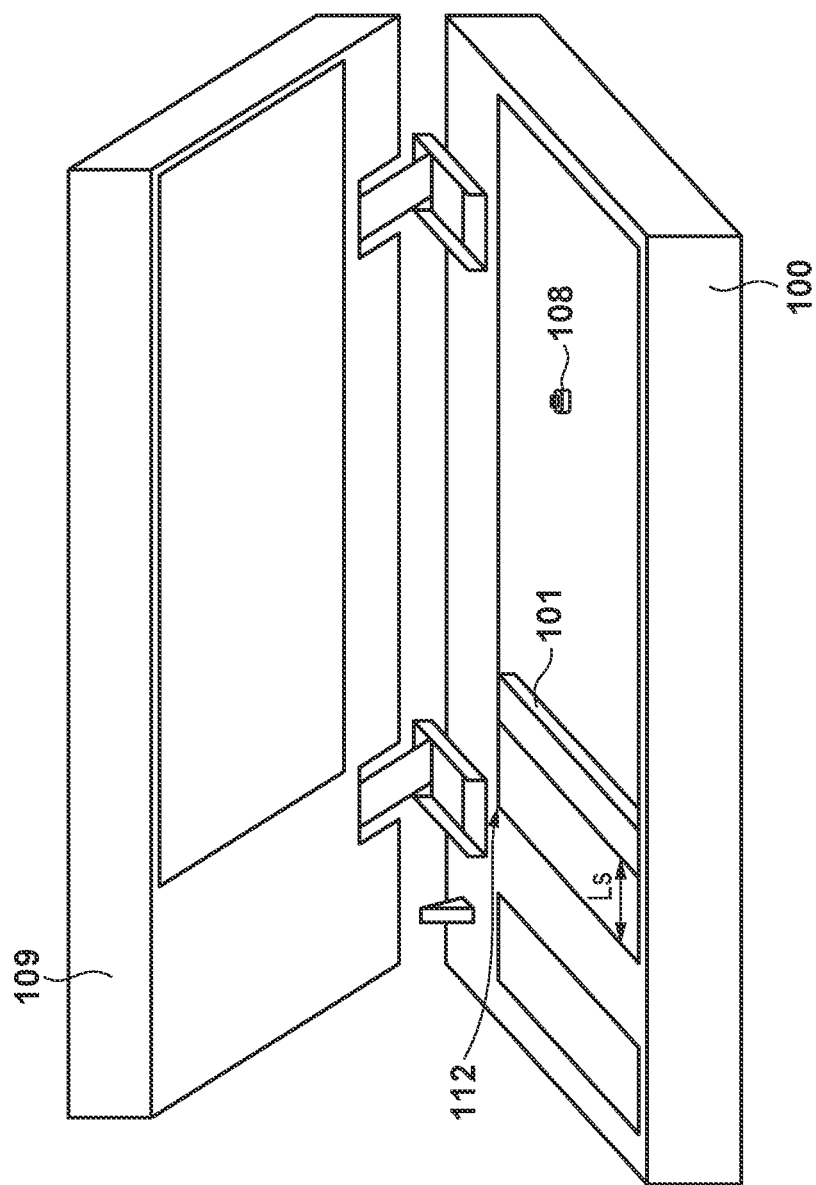
FIG. 4 is a perspective view of the image reading apparatus.

FIG. 3 is a flowchart of processing for detecting the document size in the present embodiment. In step S10, the CPU 201 waits until the pressing plate 109 shifts to an open state. When the pressing plate 109 has shifted to an open state, in step S11, the CPU 201 causes the scanner unit 101 to move to a size detection position, as shown in FIG. 4, and acquires a detection result S0 of the document detection sensor 108 in a state in which the pressing plate 109 is in an open state, in step S12. As shown in FIG. 4, the size detection position is a position separated from the abutting position 112 by Ls in the sub scanning direction, and is a position that is closer to the abutting position 112 relative to the position of the document detection sensor 108. Note that, in this example, Ls=50 mm.

Returning to FIG. 3, in step S13, the CPU 201 detects whether or not the pressing plate 109 is in a closed state. When the pressing plate 109 has shifted to a closed state, the CPU 201 executes later-described first detection processing, and ends the processing in FIG. 3. On the other hand, if the pressing plate 109 remains in an open state, in step S14, the CPU 201 determines whether or not a user has instructed to start reading the document through the console display unit 2002. If it is determined that the user has instructed to start reading the document, in step S16, the CPU 201 executes later-described second detection processing, reads an image of the document after the second detection processing has ended, in step S17, and ends the processing in FIG. 3. If it is determined, in step S14, that the user has not instructed to start reading the document, in step S18, the CPU 201 determines whether the user has instructed to start measuring the document size through the console display unit 2002. If it is determined that the user has not instructed to start measuring the document size, the CPU 201 repeats the processing from step S13. On the other hand, if it is determined that the user has instructed to start measuring the document size, the CPU 201 executes later-described third detection processing, in step S19, and ends the processing in FIG. 3 after the third detection processing has been executed.

First Detection Processing

Figure 5:
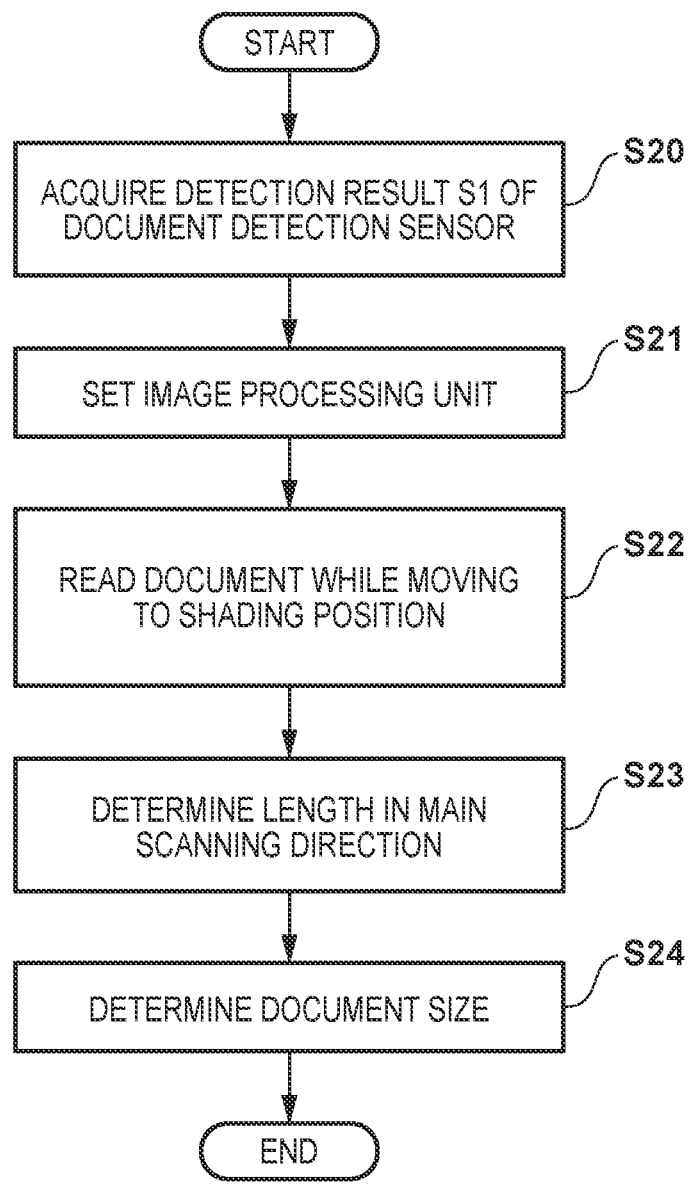
FIG. 5 is a flowchart of first detection processing.

FIG. 5 is a flowchart of the first detection processing. Note that, in the first detection processing, the document size is detected assuming that the document has a regular size. In step S20, the CPU 201 acquires a detection result S1 of the document detection sensor 108 when the pressing plate 109 is in a closed state, and stores the detection result S1 in the RAM 203. Also, in step S21, the CPU 201 sets parameters for size detection to the image processing unit 206. In step S22, the CPU 201 reads an image of the document while moving the scanner unit 101 from the size detection position to the shading position shown in FIG. 1A. The image processing unit 206 detects an edge of the document in parallel with the sub scanning direction from the image read in step S22. In step S23, the CPU 201 determines the distance from the abutting position 112 to the edge that extends in the sub scanning direction and is detected by the image processing unit 206 as the length of the document in the main scanning direction. In step S24, the CPU 201 detects the size of the document, as shown in FIG. 6, based on the determined length in the main scanning direction and the detection results S0 and S1 of the document detection sensor 108. Note that the detection results S0 and S1 being the same indicates that the document is present at a position opposing the document detection sensor 108, and the detection results S0 and S1 being not the same indicates that the document is not present at the position opposing the document detection sensor 108.

Second Detection Processing

Figure 7:
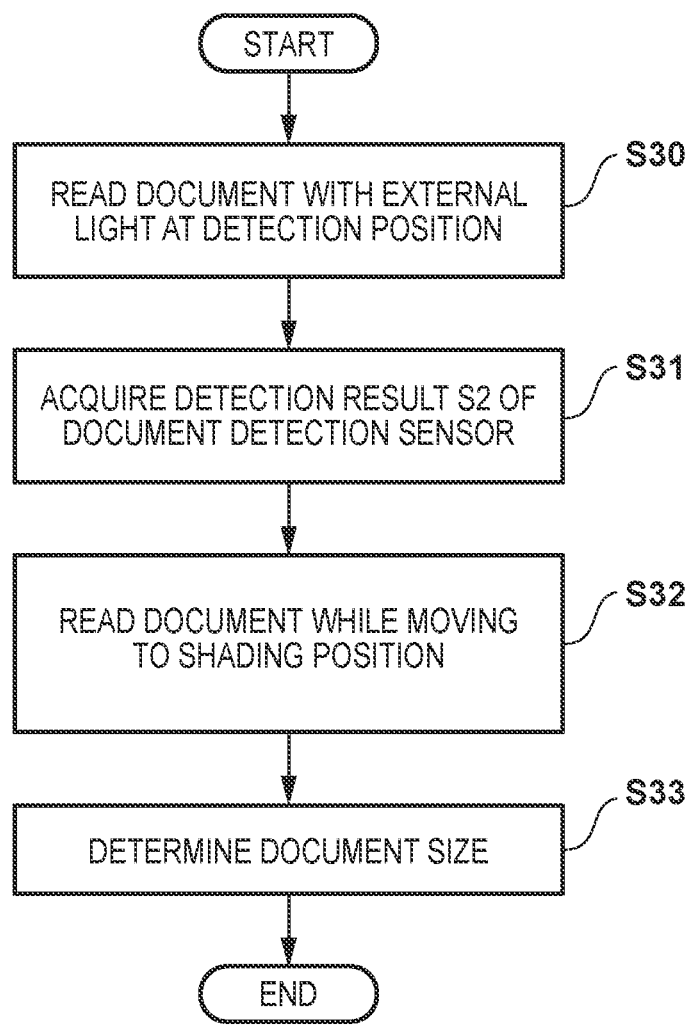
FIG. 7 is a flowchart of second detection processing.
Figures 8A, 8B:
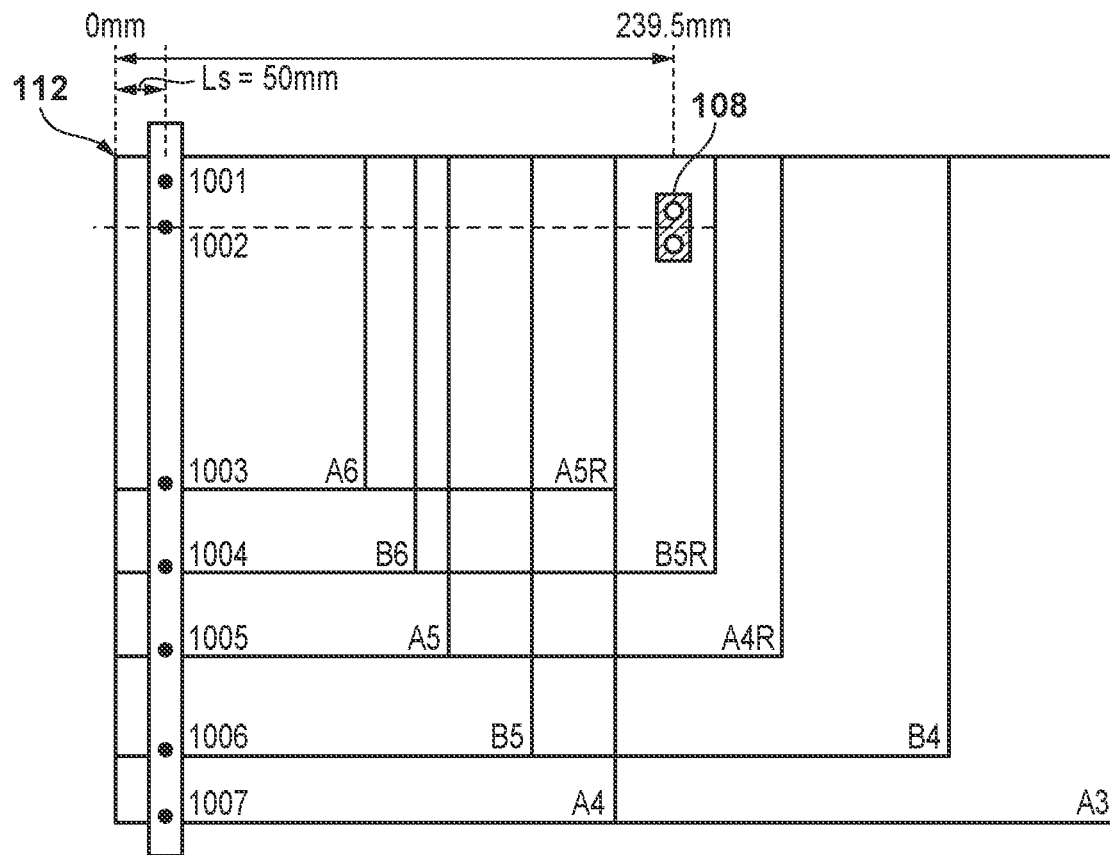
FIGS. 8A and 8B are diagrams illustrating the second detection processing.

FIG. 7 is a flowchart of the second detection processing. Note that, in the second detection processing as well, the document size is detected assuming that the document has a regular size. In step S30, the CPU 201 causes the line sensor 107 to read an image of one line of the document while keeping the light source 102 in an off state at the size detection position. Because the pressing plate 109 is in an open state, the line sensor 107 can read an image with external light. Specifically, pixels of the line sensor 107 corresponding to a range, in the main scanning direction, covered by the document on the platen glass 103 do not receive light, and pixels of the line sensor 107 corresponding to a range that is not covered by the document receive external light that has transmitted through the platen glass 103. The CPU 201 determines the densities of pixels at seven predetermined positions from light receiving amounts of corresponding pixels, and stores the densities to the RAM 203 as image data M0[n] (n=1 to 7). Note that n is an index indication a position out of the seven positions. FIG. 8A shows an example of seven positions 1001 to 1007. The position 1002 is the same position as the detection position of the document detection sensor 108 in the main scanning direction. Also, the position 1001 is a position closer to the abutting position 112 relative to the position 1002 in the main scanning direction. Also, the positions 1003 to 1007 are positions respectively corresponding to the sizes, of the long side, of A6, B6, A5, B5, and A4.

Returning to FIG. 7, in step S31, the CPU 201 acquires a latest detection result S2 of the document detection sensor 108 in a state in which the pressing plate 109 is in an open state. In step S32, the CPU 201 reads an image of one line of the document at a predetermined position in the sub scanning direction while moving the scanner unit 101 from the size detection position to the shading position. Note that, the CPU 201 causes the light source 102 to emit light at this moment. The CPU 201 stores the densities of pixels at the predetermined seven positions 1001 to 1007 in a read image of one line to the RAM 203 as image data M1[n] (n=1 to 7). In step S33, the CPU 201 determines the size of the document based on the detection result S2 and the image data M0[n] and the image data M1 [n].

Specifically, the CPU 201 determines the range, in the main scanning direction, of the platen glass 103 that is covered by the document based on the image data M0[n] and image data M1 [n]. Then, the CPU 201 determines the size of the document based on the range, in the main scanning direction, that is covered by the document, and whether or not the detection result S2 indicates that a document is present, as shown in FIG. 8B. For example, if the detection result S2 indicates that a document is present in a state in which the document covers up to the position 1005 in the main scanning direction, it can be determined that the document size is A4R, as is clear from FIG. 8A. On the other hand, if the detection result S2 indicates that a document is not present in a state in which the document covers up to the position 1005, it can be determined that the document size is A5, as is clear from FIG. 8A.

Figures 9A, 9B, 9C:
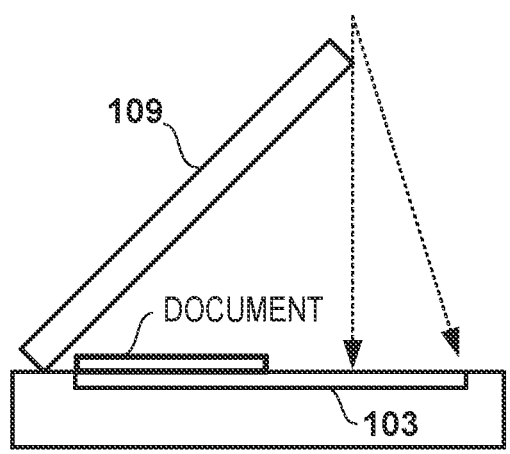
FIGS. 9A to 9C are diagrams illustrating the second detection processing.

FIGS. 9A to 9C are diagrams illustrating processing for determining the range, in the main scanning direction, covered by a document based on image data M0[n] and image data M1 [n]. First, in step S30, because the light source 102 does not emit light, external light is incident on the line sensor 107 via the platen glass 103. Note that the range of pixels of the line sensor 107 on which external light is incident depends on the angle of opening of the pressing plate 109, the position of a light source of the external light, and the like, in addition to the size of the document on the platen glass 103. For example, even if a document that covers until the position 1004 is placed on the platen glass 103, external light is not necessarily incident on all of the pixels corresponding to the positions 1005 to 1007. In the example in FIG. 9B, external light is incident on the pixels corresponding to the positions 1006 and 1007, and therefore white is determined in these pixels. On the other hand, because external light is not incident on the pixels corresponding to other positions, or the amount of external light is small, black is determined in these pixels. However, it can be determined that at least positions 1006 and 1007 are not covered by the document based on the image data M0[n].

Therefore, the CPU 201 excludes data corresponding to n=6 and 7 from the image data M1[1] to M1[7], the positions corresponding to n=6 and 7 having being determined to be not covered by the document based on image data M0[n], and determines the range, in the main scanning direction, covered by the document based on the image data M1[1] to M1[5]. Note that since the image data M1[n] is obtained by reading while causing the light source 102 to emit light, pixels corresponding to a range that is not covered by the document do not receive reflected light, and therefore black is determined in these pixels. Note that, in pixels corresponding to the range covered by the document, colors of the document at positions corresponding to the respective pixels are determined. The CPU 201 determines whether or not the image data M1[1] to M1[5] indicate black in a descending order from the image data M1[5] that corresponds to the position farthest from the abutting position 112. Then, the CPU 201 determines that the position corresponding to the pixel in which color other than black is first determined is an edge of the document. For example, when the pieces of image data M1[1] to M1[5] are as shown in FIG. 9C, the CPU 201 determines that the position 1004 corresponding to the image data M1[4] is the edge.

Third Detection Processing

Figure 10:
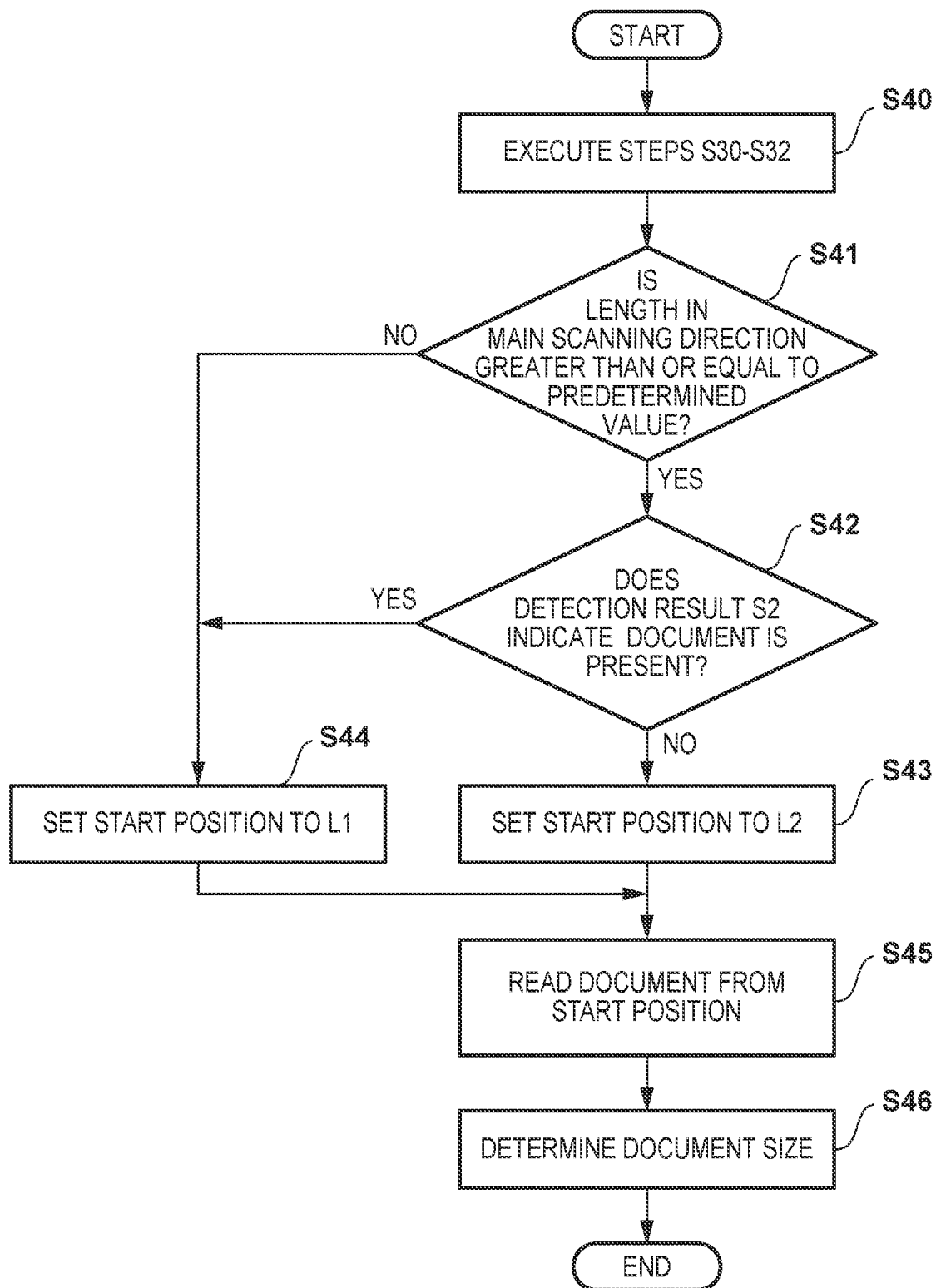
FIG. 10 is a flowchart of third detection processing.

FIG. 10 is a flowchart of the third detection processing. In step S40, the CPU 201 executes processing in steps S30 to S32 in FIG. 7, and acquires a detection result S2 of the document detection sensor 108 and image data M0 and M1. Next, in step S41, the CPU 201 determines whether the range, in the main scanning direction, of the platen glass 103 covered by a document that has been detected based on the image data M0 and M1 includes the detection position of the document detection sensor 108 in the main scanning direction. That is, the CPU 201 determines whether the length of the document in the main scanning direction is greater than or equal to the detectable length of the document detection sensor 108. If the length of the document in the main scanning direction is greater than or equal to the detectable length of the document detection sensor 108, the CPU 201 determines whether the detection result S2 of the document detection sensor 108 indicates that a document is present, in step S42. If the detection result S2 of the document detection sensor 108 indicates that a document is present, the CPU 201 sets the reading start position to L1, in step S44, and if the detection result S2 does not indicate that a document is present, the CPU 201 sets the reading start position to L2, in step S43.

Figure 11:
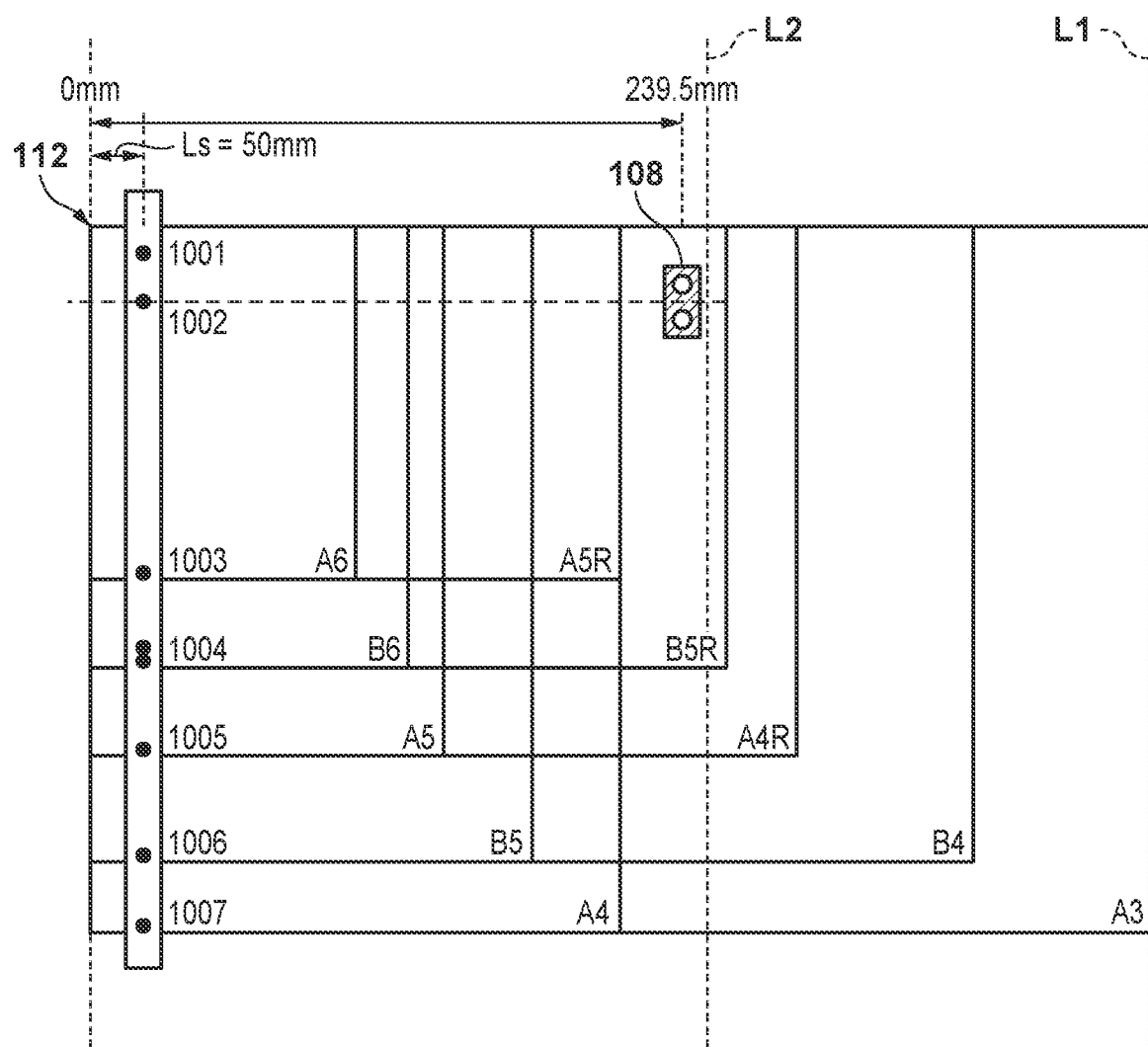
FIG. 11 is a diagram illustrating the third detection processing.

The reading start positions L1 and L2 are shown in FIG. 11. The reading start position L1 is an end portion, of the range in which the scanner unit 101 can move in the sub scanning direction, on the side opposite to the abutting position 112. On the other hand, the reading start position L2 is a position in the vicinity of the document detection position of the document detection sensor 108. According to FIG. 11, the reading start position L2 is a position, in the sub scanning direction, that is on a side opposite to the abutting position 112 relative to the document detection position of the document detection sensor 108, and is separate from the document detection sensor 108 by a predetermined distance. However, the reading start position L2 can be set to the document detection position of the document detection sensor 108, for example. On the other hand, in step S41, if the length of the document in the main scanning direction is not greater than or equal to the detectable length of the document detection sensor 108, the CPU 201 sets the reading start position to L1, in step S44.

When the processing in step S43 and step S44 has ended, the scanner unit 101 is at the shading position, and therefore the CPU 201, after executing the shading correction, causes the scanner unit 101 to move to the start position (L1 or L2). Then, in step S45, the CPU 201 reads the document while moving the scanner unit 101 from the start position toward the abutting position 112. Also, in step S46, the CPU 201 determines the size of the document from the result of reading the document. Specifically, the CPU 201 detects a first edge of the document that is in parallel with the main scanning direction by comparing densities of pixels that are adjacent in the sub scanning direction. With this, it can be determined that the distance between the abutting position 112 and the detected first edge is the length of the document in the sub scanning direction. Next, the CPU 201 determines the change in density of pixels adjacent in the main scanning direction based on the result of reading the document when the scanner unit 101 is present on the abutting position 112 side relative to the first edge, and with this, detects a second edge of the document that is in parallel with the sub scanning direction. With this, it can be determined that the distance between the abutting position 112 and the detected second edge is the length of the document in the main scanning direction.

As described above, in the present embodiment, the pressing plate 109 is set to an open state, and the size of a document including an irregular size is determined based on the result of reading the document by the scanner unit 101. Here, the position at which reading of the document by the scanner unit 101 is to be started is controlled based on the result of detecting the document by the document detection sensor 108, and the result of determining whether the range of the document in the main scanning direction includes the position that can be detected by the document detection sensor 108. Note that the document detection sensor 108 is provided at a position that is separated from the abutting position 112 by a first distance in the sub scanning direction, and is separated by a second distance in the main scanning direction. When the detection result of the document detection sensor 108 indicates that a document is present, the length of the document in the sub scanning direction with reference to the abutting position 112 is larger than the length to the position of the document detection sensor 108 in the sub scanning direction. Therefore, L1 is selected as the reading start position. Also, when, although the determination results indicates that the range of the document in the main scanning direction includes the position that can be detected by the document detection sensor 108, the detection result indicates that a document is not present, the edge, of the document, that is in parallel with the main scanning direction is on the abutting position 112 side, in the sub scanning direction, relative to the document detection sensor 108. Therefore, L2 is selected as the reading start position in order to shorten the period of time during which the scanner unit 101 emits light at positions at which the document is not present.

Figure 12A:
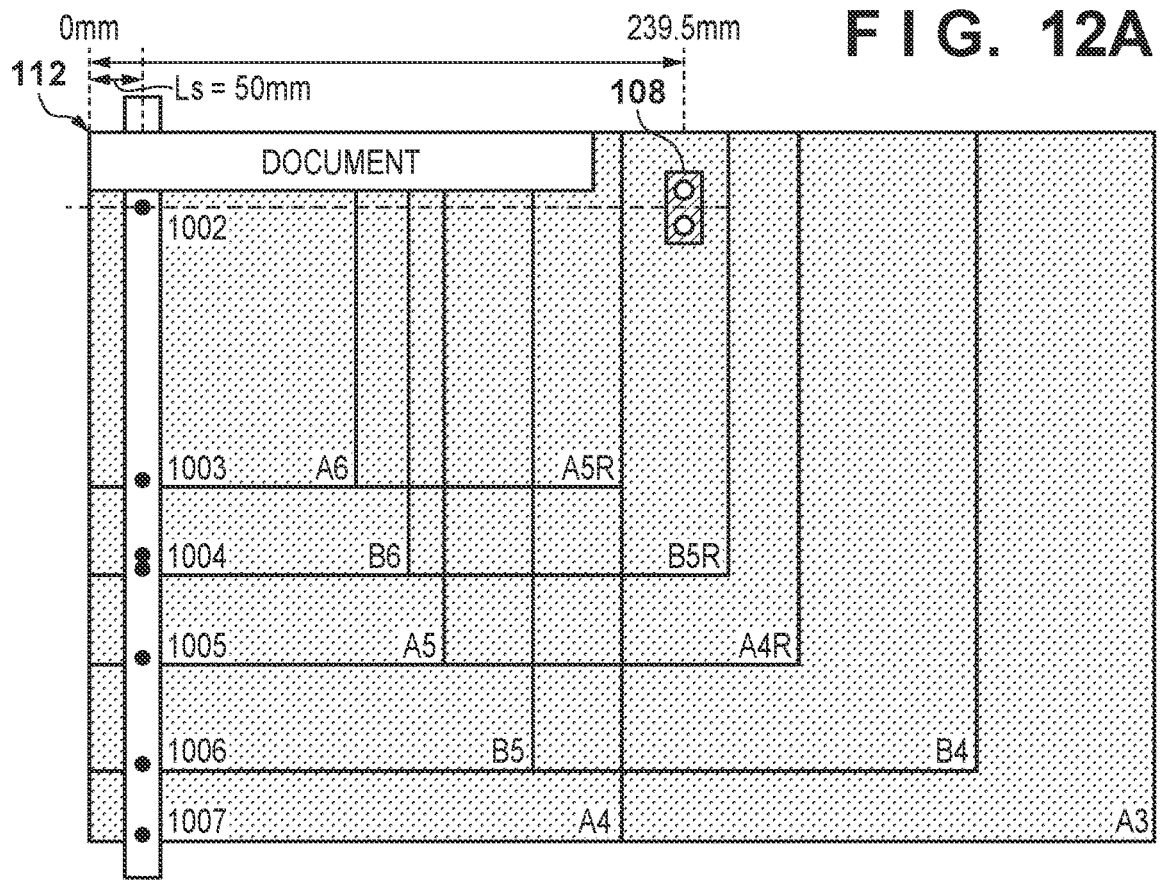
FIGS. 12A and 12B are diagrams illustrating the third detection processing.
Figure 12B:
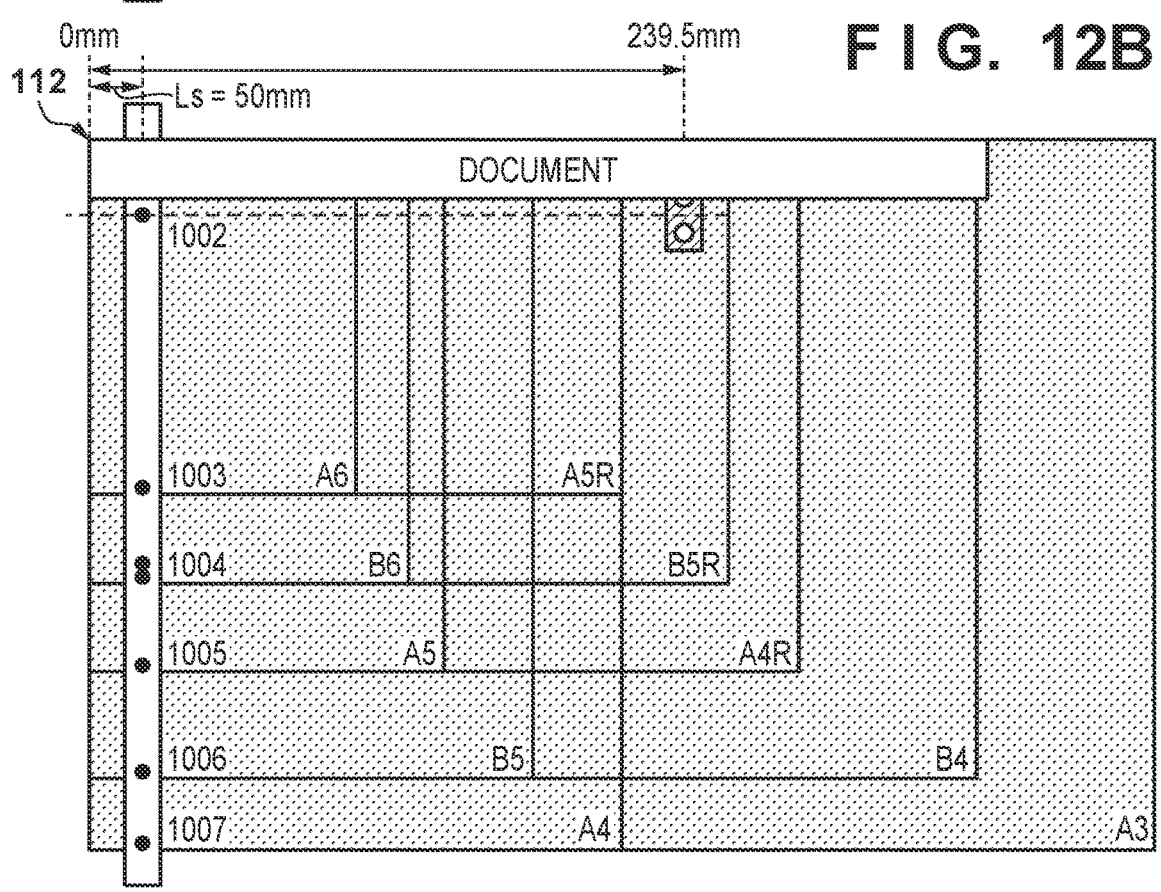

On the other hand, when the determination results indicate that the range of the document in the main scanning direction does not include the position that can be detected by the document detection sensor 108, it is impossible to discriminate between the states shown in FIGS. 12A and 12B. That is, whether the length of the document in the sub scanning direction is greater than or equal to a predetermined length cannot be determined. Therefore, L1 is selected as the reading start position. As a result of adopting the configuration described above, the period of time can be made shorter during which the scanner unit 101 emits light at positions at which a document is not present. Note that the document detection sensor 108 can be arranged or configured such that, when the length of a document in the sub scanning direction with reference to the abutting position 112 is larger than the distance between the document detection sensor 108 and the abutting position 112, the document can be detected regardless of the length of the document in the main scanning direction. That is, the document detection sensor 108 can be arranged or configured such that the detection position of the document detection sensor 108 in the main scanning direction is substantially the same as the position of the abutting position 112. In this case, it is possible to determine the reading start position based only on the detection result of the document detection sensor 108.

Note that the pressing plate 109 may be an automatic document feeder (ADF) with which an image of a document is read while conveying the document. The ADF includes a stacking tray on which a document is to be stacked, a conveying unit configured to convey the document stacked on the stacking tray in a sub scanning direction, a discharging unit configured to discharge the document conveyed by the conveying unit; and a discharge tray on which the document discharged by the discharging unit is to be stacked. The scanner unit 101 reads an image on the document conveyed by the conveying unit, the discharging unit discharges the document, whose image has been read by the scanner unit 101. The discharging unit is configured to discharge the document in the sub scanning direction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-190313, filed on Oct. 5, 2018, which is hereby incorporated by reference herein in its entirety.

What is claimed is:

1. An image reading apparatus comprising:
   a reading unit that comprises:
      a transparent member on which a document is to be placed,
      a first positioning portion for positioning the document placed on the transparent member in a first direction by coming into contact with the document placed on the transparent member,
      a light source configured to emit light, and
      a reading element configured to receive light reflected from the document placed on the transparent member and to read an image on the document placed on the transparent member while moving the light source in the first direction;
   a first sensor provided at a detection position separated from the first positioning portion by a first predetermined distance in the first direction, and configured to detect whether or not the document is present on the transparent member at the detection position; and
   at least one processor configured to:
      determine a position of an edge portion of the document placed on the transparent member in the first direction based on the image obtained by the reading unit in a period in which the light source moves from a measurement start position toward the first positioning portion in a state where the light source emits the light; and
      set the measurement start position to a first position in a case where the document is detected by the first sensor, and set the measurement start position to a second position in a case where the document is not detected by the first sensor,
   wherein, in the first direction, a distance between the first position and the first positioning portion is larger than a distance between the second position and the first positioning portion.

2. The image reading apparatus according to claim 1, further comprising:
   a cover member that pivots with respect to the reading unit; and
   a second sensor configured to detect whether or not the cover member has pivoted by a predetermined angle or more with respect to the reading unit,
   wherein the at least one processor is configured to determine the position of the edge portion of the document placed on the transparent member in the first direction based on the image obtained by the reading unit in the period in which the light source moves from the measurement start position toward the first positioning portion in the state in which the second sensor has detected that the cover member has pivoted by the predetermined angle or more with respect to the reading unit and the light source emits the light.

3. The image reading apparatus according to claim 2, wherein the cover member includes:
- a stacking tray on which a document is to be stacked;
- a conveying unit configured to convey the document stacked on the stacking tray;
- a discharging unit configured to discharge the document conveyed by the conveying unit; and
- a discharge tray on which the document discharged by the discharging unit is to be stacked, wherein the reading element is configured to read the image on the document conveyed by the conveying unit, and wherein the discharging unit is configured to discharge the document, whose image has been read by the reading element.

4. The image reading apparatus according to claim 1, further comprising a second positioning portion for positioning the document in a second direction that intersects the first direction by coming into contact with the document placed on the transparent member,
- wherein the detection position is a position separated from the second positioning portion by a second predetermined distance in the second direction, and
- wherein the at least one processor is configured to set the measurement start position to the first position in a case where the detection position is not included in a range, in the second direction, of the transparent member that is covered by the document, and set the measurement start position to the second position in a case where the detection position is included in the range in the second direction and the first sensor does not detect the document.

5. The image reading apparatus according to claim 3, wherein the at least one processor is configured to set the measurement start position to the first position in a case where the detection position is included in the range in the second direction and the first sensor detects the document.

6. The image reading apparatus according to claim 1,
- wherein the at least one processor is configured to determine whether or not the detection position is included in the range in the second direction based on a reading result of the reading element at a third position in the first direction, the third position being a position between, in the first direction, the detection position and the first positioning portion.

7. The image reading apparatus according to claim 1,
- wherein the transparent member includes an end portion in parallel with the second direction on a side opposite to the first positioning portion with respect to a center of the transparent member in the first direction, and
- the first position is a position of the end portion.

8. The image reading apparatus according to claim 1, wherein the second position is the detection position in the first direction.

9. The image reading apparatus according to claim 1, wherein the second position is a position between, in the first direction, the first position and the detection position.

* * * * *